United States Patent
Suciu et al.

(10) Patent No.: US 9,884,674 B2
(45) Date of Patent: *Feb. 6, 2018

(54) STABILIZER WITH STRUCTURAL BOX AND SACRIFICIAL SURFACES

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/440,995

(22) PCT Filed: Oct. 17, 2013

(86) PCT No.: PCT/US2013/065417
§ 371 (c)(1),
(2) Date: May 6, 2015

(87) PCT Pub. No.: WO2014/078006
PCT Pub. Date: May 22, 2014

(65) Prior Publication Data
US 2015/0284067 A1 Oct. 8, 2015

Related U.S. Application Data

(60) Provisional application No. 61/726,737, filed on Nov. 15, 2012, provisional application No. 61/735,717, filed on Dec. 11, 2012.

(51) Int. Cl.
*B64C 9/00* (2006.01)
*B64C 5/02* (2006.01)
(Continued)

(52) U.S. Cl.
CPC .............. *B64C 5/02* (2013.01); *B64C 1/26* (2013.01); *B64C 5/06* (2013.01); *B64C 9/02* (2013.01);
(Continued)

(58) Field of Classification Search
CPC .... B64C 5/02; B64C 1/26; B64C 5/06; B64C 9/02; B64C 19/00; B64C 2001/0027;
(Continued)

(56) References Cited

U.S. PATENT DOCUMENTS 3,972,490 A * 8/1976 Zimmermann ......... F02C 3/073
244/12.3
4,291,853 A * 9/1981 Sigalla ..................... B64C 5/02
244/199.1
(Continued)

FOREIGN PATENT DOCUMENTS

GB            526775 A * 9/1940 ............... B64C 5/02
JP       2008075582       4/2008

OTHER PUBLICATIONS

European Search Report for EP Application No. 13856025.5 dated Oct. 26, 2015.
(Continued)

*Primary Examiner* — Richard G Davis
(74) *Attorney, Agent, or Firm* — Carlson, Gaskey & Olds, P.C.

(57) ABSTRACT

An aircraft includes a tail extending from a fuselage. The tail defines a structural box having first and second vertical stabilizers that support a horizontal stabilizer. The tail includes at least one sacrificial control surface and at least one primary control surface. The primary control surfaces maintain aircraft controllability in the event that the sacrificial control surface becomes inoperable.

16 Claims, 5 Drawing Sheets

(51) Int. Cl.
*B64D 27/14* (2006.01)
*B64C 5/06* (2006.01)
*B64C 9/02* (2006.01)
*B64C 19/00* (2006.01)
*B64D 33/04* (2006.01)
*F02K 1/56* (2006.01)
*F02K 1/78* (2006.01)
*B64C 1/26* (2006.01)

(52) U.S. Cl.
CPC .............. *B64C 19/00* (2013.01); *B64D 27/14* (2013.01); *B64D 33/04* (2013.01); *F02K 1/56* (2013.01); *F02K 1/78* (2013.01)

(58) Field of Classification Search
CPC ........ B64D 27/14; B64D 33/04; B64D 27/20; F02K 1/56; F02K 1/78
See application file for complete search history.

(56) References Cited

U.S. PATENT DOCUMENTS

| | | | |
|---|---|---|---|
| 4,447,022 A | 5/1984 | Lion | |
| 4,448,372 A | 5/1984 | Larson | |
| 4,500,055 A | 2/1985 | Krojer | |
| 5,131,605 A | 7/1992 | Kress | |
| 5,289,996 A | 3/1994 | Speelman, III | |
| 5,445,346 A | 8/1995 | Gilbert | |
| 5,979,824 A * | 11/1999 | Gagliano | B64C 1/26 244/13 |
| 6,273,363 B1 * | 8/2001 | Sprenger | B64C 5/06 244/119 |
| 6,543,718 B2 | 4/2003 | Provost | |
| 6,792,746 B2 | 9/2004 | Saito et al. | |
| 6,824,092 B1 * | 11/2004 | Franklin, III | B64C 30/00 244/1 N |
| 7,107,755 B2 | 9/2006 | El Hamel et al. | |
| 7,540,450 B2 | 6/2009 | Brand et al. | |
| 7,600,717 B2 | 10/2009 | Ward | |
| 7,775,834 B2 | 8/2010 | Zauber et al. | |
| 7,780,116 B2 | 8/2010 | Payen | |
| 8,015,796 B2 | 9/2011 | Babu et al. | |
| 8,167,239 B2 | 5/2012 | Guering et al. | |
| 8,186,617 B2 * | 5/2012 | Llamas Sandin | B64C 39/068 244/34 R |
| 2004/0025493 A1 | 2/2004 | Wojciechowski | |
| 2004/0245374 A1 * | 12/2004 | Morgan | B64C 29/0025 244/12.3 |
| 2005/0262682 A1 * | 12/2005 | Grover | B23P 9/025 29/428 |
| 2006/0144991 A1 | 7/2006 | Frediani | |
| 2008/0073459 A1 * | 3/2008 | Cazals | B64C 5/06 244/13 |
| 2009/0020643 A1 | 1/2009 | Gall et al. | |
| 2009/0065632 A1 * | 3/2009 | Cazals | B64C 5/02 244/15 |
| 2009/0084889 A1 * | 4/2009 | Cazals | B64C 5/02 244/12.1 |
| 2010/0032520 A1 * | 2/2010 | Mauran | B64C 9/02 244/99.4 |
| 2010/0059623 A1 * | 3/2010 | Cazals | B64C 1/26 244/46 |
| 2010/0133377 A1 * | 6/2010 | Cazals | B64C 1/0009 244/55 |
| 2010/0148000 A1 * | 6/2010 | Llamas Sandin | B64C 5/02 244/87 |
| 2010/0212288 A1 * | 8/2010 | Suchezky | B64C 15/12 60/228 |
| 2010/0243810 A1 * | 9/2010 | Lobo Barros | B64C 1/26 244/131 |
| 2010/0264264 A1 | 10/2010 | Gall et al. | |
| 2011/0036939 A1 * | 2/2011 | Easter | B60F 5/02 244/2 |
| 2011/0061579 A1 * | 3/2011 | Van Gelder | B62D 35/007 114/140 |
| 2011/0220758 A1 * | 9/2011 | Cazals | B64D 27/20 244/55 |
| 2012/0104184 A1 * | 5/2012 | Weber | B64C 5/06 244/76 C |
| 2012/0168559 A1 * | 7/2012 | Dennison | B64C 1/26 244/87 |
| 2012/0272656 A1 | 11/2012 | Norris | |
| 2013/0001356 A1 | 1/2013 | Llamas Sandin et al. | |

OTHER PUBLICATIONS

International Preliminary Report on Patentability for International Application No. PCT/US2013/065417 dated May 28, 2015.
International Search Report and Written Opinion for International Application No. PCT/US2013/065417 dated Jan. 9, 2014.

* cited by examiner

STABILIZER WITH STRUCTURAL BOX AND SACRIFICIAL SURFACES

CROSS REFERENCE TO RELATED APPLICATION

This application claims priority to U.S. Provisional Application No. 61/726,737 filed Nov. 15, 2012 and U.S. Provisional Application No. 61/735,717 filed Dec. 11, 2012.

BACKGROUND

Conventional aircraft architecture includes wing mounted gas turbine engines. In some aircraft architectures gas turbine engines are mounted atop the fuselage or on opposite sides of the aircraft fuselage.

Commercial aircraft typically utilize gas turbine engines that in include a fan section driven by a core engine or gas generator. The gas generator engine includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

Alternate aircraft architectures may require alternate mounting locations of the gas turbine engines to enable specific wing and fuselage configurations. However, conventional gas turbine engine configurations have been developed to operate with conventional aircraft architectures. Accordingly, alternate gas turbine engine configurations may be required to enable implementation of favorable aspects of alternate aircraft architectures.

SUMMARY

An aircraft fuselage, according to an exemplary embodiment of this disclosure includes a tail extending from a fuselage. The tail defines a structural box that has first and second vertical stabilizers that support a horizontal stabilizer. The tail includes at least one sacrificial control surface and at least one primary control surfaces. The primary control surfaces maintain aircraft controllability separate from the at least one sacrificial control surface.

In a further embodiment of the above, the sacrificial control surface and primary control surfaces are part of the horizontal stabilizer.

In a further embodiment of the above, the horizontal stabilizer is spaced apart from the fuselage in a direction that is substantially perpendicular to a longitudinal centerline of the fuselage.

In a further embodiment of the above, the primary control surface is disposed between the first and second vertical stabilizers.

In a further embodiment of the above, the structural box includes the first and second vertical stabilizers and the primary control surfaces disposed between the first and second vertical stabilizers.

In a further embodiment of the above, a propulsion system is mounted to an aft end of the fuselage. A burst zone is defined about the propulsion system that encompasses at least one sacrificial control surface.

In a further embodiment of the above, the propulsion system includes a gas turbine engine with a gas generator that is disposed about a first axis that drives a fan section that is disposed about a second axis angled relative to the first axis.

In a further embodiment of the above, the first axis is angled relative to a longitudinal centerline of the fuselage.

In a further embodiment of the above, the gas generator includes a fan drive gear system for driving the fan section.

An aircraft assembly according to another exemplary embodiment includes a fuselage having a forward portion and an aft portion and a turbine engine mounted within the aft portion. A burst zone is defined about the turbine engine. A tail is disposed at least partially with the burst zone. The tail portion has a horizontal stabilizer supported across a first vertical stabilizer and a second vertical stabilizer. The horizontal stabilizer further includes at least one sacrificial control surface within the defined burst zone that is frangible from the horizontal stabilizer.

In a further embodiment of the above, a primary control surface is disposed between the first vertical stabilizer and the second vertical stabilizer.

In a further embodiment of the above, the sacrificial control surfaces are disposed at distal ends of the horizontal stabilizer.

In a further embodiment of the above, the primary control surface is disposed between sacrificial control surfaces.

In a further embodiment of the above, the turbine engine comprises first and second turbine engines defining corresponding first and second burst zones.

In a further embodiment of the above, the first and second turbine engines include corresponding gas generator sections disposed about different axes that are angled away from each other.

In a further embodiment of the above, the gas generators are angled relative to a longitudinal centerline of the fuselage.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
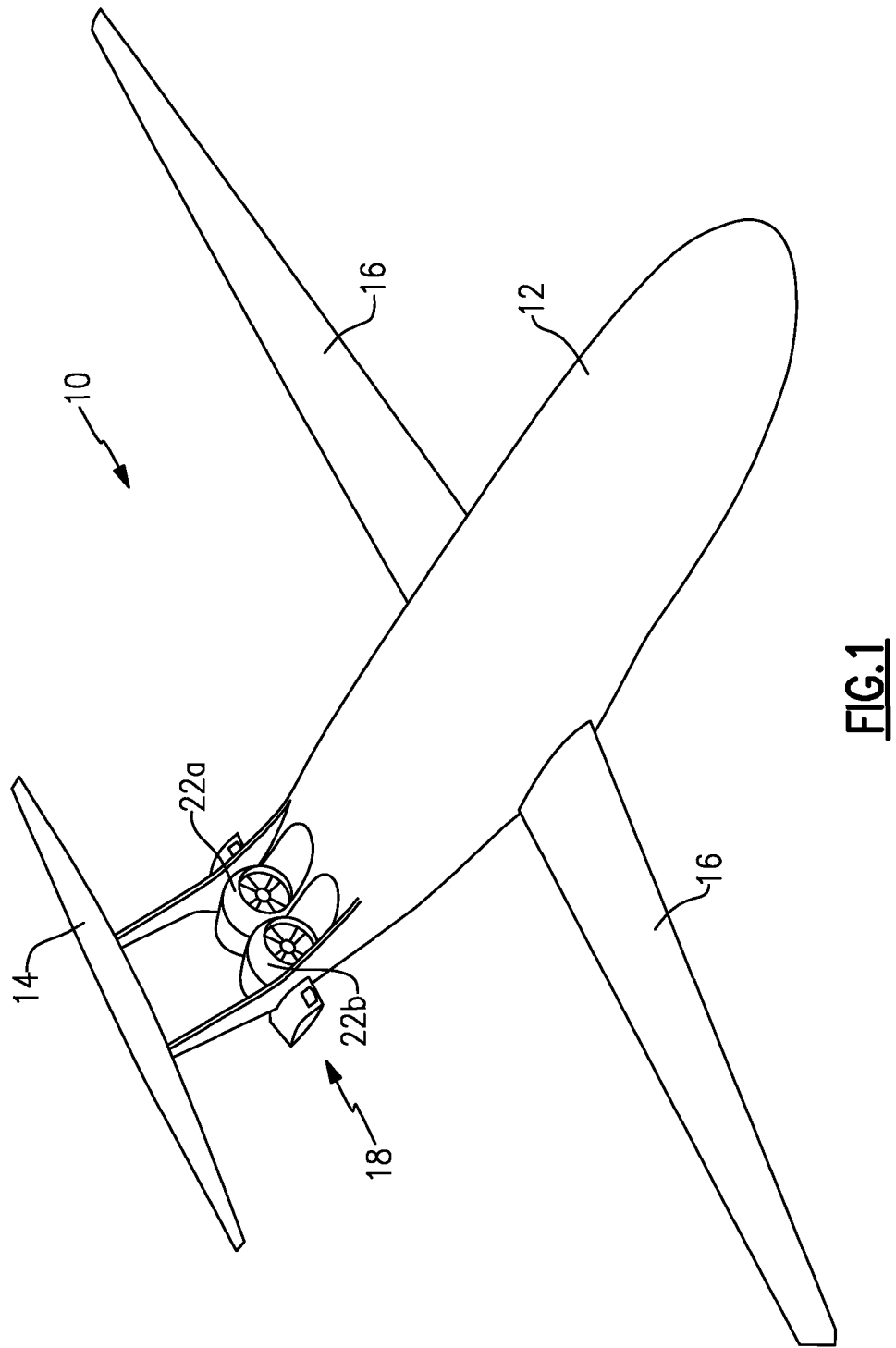
FIG. 1 is a schematic view of an example aircraft including an aft mounted propulsion system.
Figure 2:
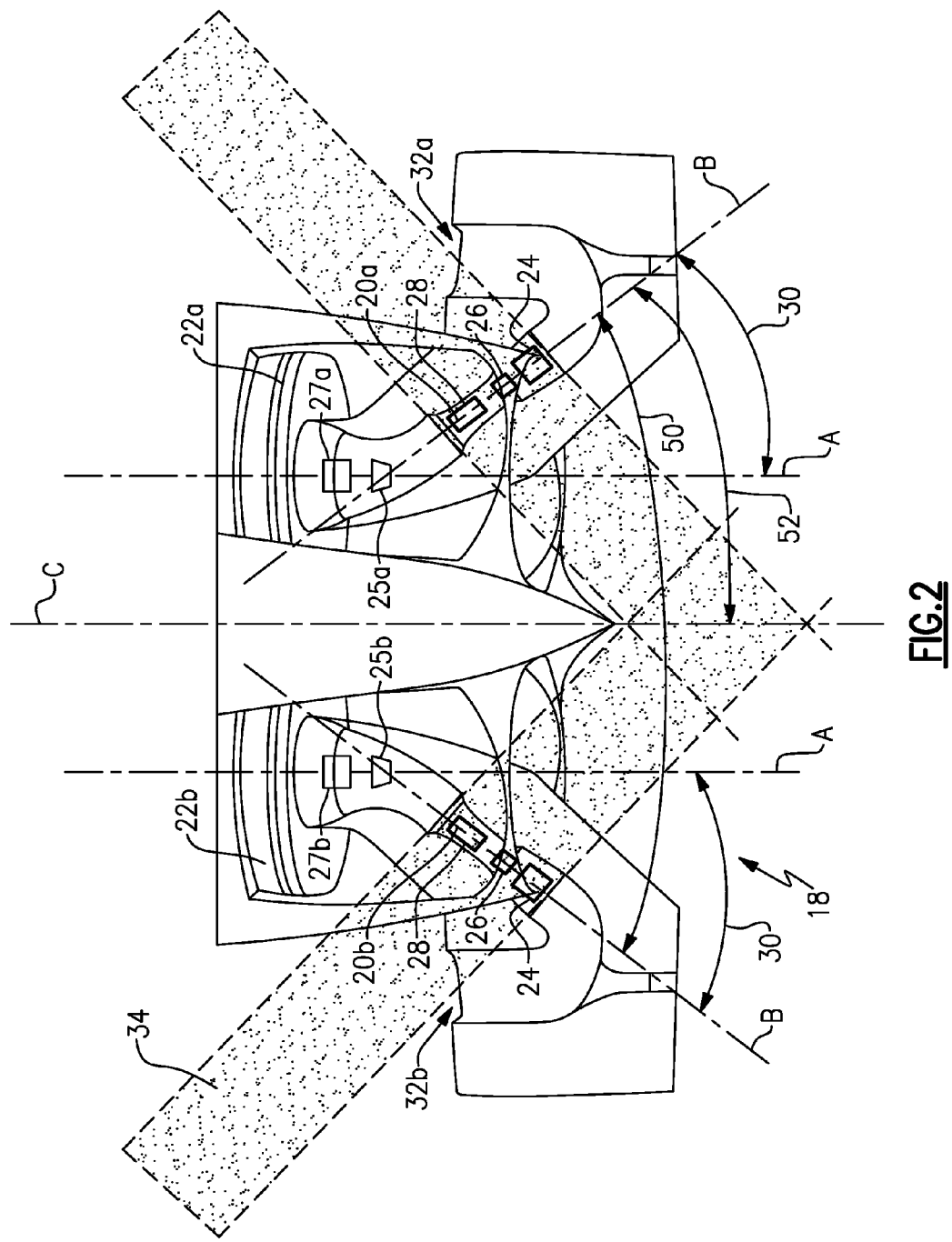
FIG. 2 is a schematic view of an example propulsion system.

Referring to the FIGS. 1 and 2 an aircraft 10 includes a fuselage 12 having wings 16 and a tail 14. A propulsion system 18 is mounted aft end of the fuselage 12. The propulsion system 18 includes first and second gas turbine engines. The gas turbine engines include first and second gas generators 20*a-b* that drives corresponding first and second fan sections 22*a-b*.

Each of the first and second gas generators 20a-b are disposed about an engine axis A and drive the corresponding fan sections 22a-b about a second axis B. The first axis A and second axis B are angled relative to each other. In traditional engine architectures, the axis of the gas generator is aligned in the same direction as the axis of the propulsor (or fan). When the gas generator is rotated more than 90 degrees relative to the propulsor, it is considered a reverse core engine. This configuration allows the fan to be driven by a free turbine 25a-b, which is powered by the exhaust from the gas generator. The free turbine 25a-b may drive a fan drive gear system 27a-b that enables the free turbine 25a-b and fan to rotate at different rotational speeds. The gas generators in this example include a compressor 24, a combustor 26 and a turbine 28. Air is drawn in through inlets 32a-b to the compressor 24 is compressed and communicated to a combustor 26. In the combustor 26, air is mixed with fuel and ignited to generate a high pressure exhaust gas stream that expands through the turbine 28 where some energy is extracted and utilized to drive the compressor 24. The output from the gas generator is a stream of high-pressured gas that drives the free turbine, and its corresponding fan 22a-b.

In the disclosed example, each of the first and second fans 22a-b is mounted substantially parallel to each other about respective second axes A. The two axes A are also disposed substantially parallel to aircraft longitudinal axis C. Gas turbine engines are not typically mounted next to each other due to practical limitations related to overall aircraft survivability in the event of engine failure. A burst zone is defined around gas turbine engines within which another gas turbine engine is not permitted due to possible fragmentation from one failed engine disabling the second engine.

The disclosed gas generators 20a-b are disposed along a second axis B at an angle 30 relative to the corresponding axes A and to each other such that neither gas generator 20a-b is disposed within a burst zone 34 of the other gas generator 20a-b. Each of the gas generators 20a-b is disposed at an angle 50 away from the other gas generator 20a-b such that each is orientated outside of the others bust zone 34. The gas generators 20a-b are further set at an angle 52 relative to the aircraft longitudinal axis C.

Figure 3:
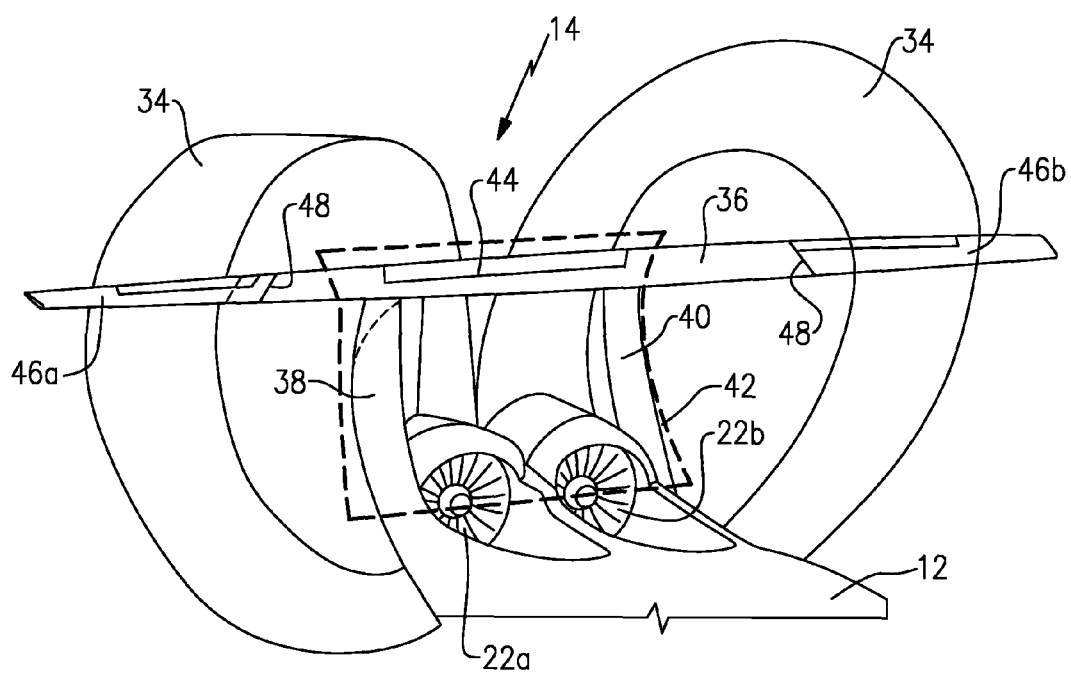
FIG. 3 is a schematic view of an example burst zone.

Referring to FIG. 3 with continued reference to FIGS. 1 and 2, the aircraft tail 14 includes a first vertical stabilizer 38 and a second vertical stabilizer 40 that support a horizontal stabilizer 36. The horizontal stabilizer 36 extends across the first and second vertical stabilizers 38, 40 and includes a primary control surface 44 and secondary control surfaces 46a-b. The primary control surface 44 along with the first and second vertical stabilizers 38, 40 define a structural box 42 that is at least partially disposed within the burst zone 34.

In the disclosed aircraft architecture, portions of the horizontal stabilizer 36 are within the burst zone 34 defined by the angled orientation of the gas generators 22a-b. In this example, the secondary control surfaces 46a-b are disposed within the burst zone 34. The secondary control surfaces 46a-b define regions within the burst zone that are sacrificial surfaces designed to break away in a controlled manner such that aircraft control is maintained. The horizontal stabilizer 36 includes frangible connections 48 that break away in a controlled manner to enable the aircraft 10 to maintain stability and control. The non-break away surfaces are part of the structural box 42 and include the primary control surface 44 that maintains the desired aircraft control after loss of a secondary control surface 46a-b.

The example vertical stabilizers 38, 40 define the structural box 42 that is resistant to damage from potential fragments within the bust zone. The structural box 42 includes portions of the fuselage 12, the first and second vertical stabilizers 38, 40 and the primary control surface 44 of the horizontal stabilizer 36. The structural box 42 is strengthened relative to the surrounding structures to provide a level of survivability desired to maintain the primary control surface 44 of the horizontal stabilizer 36.

Figure 4:
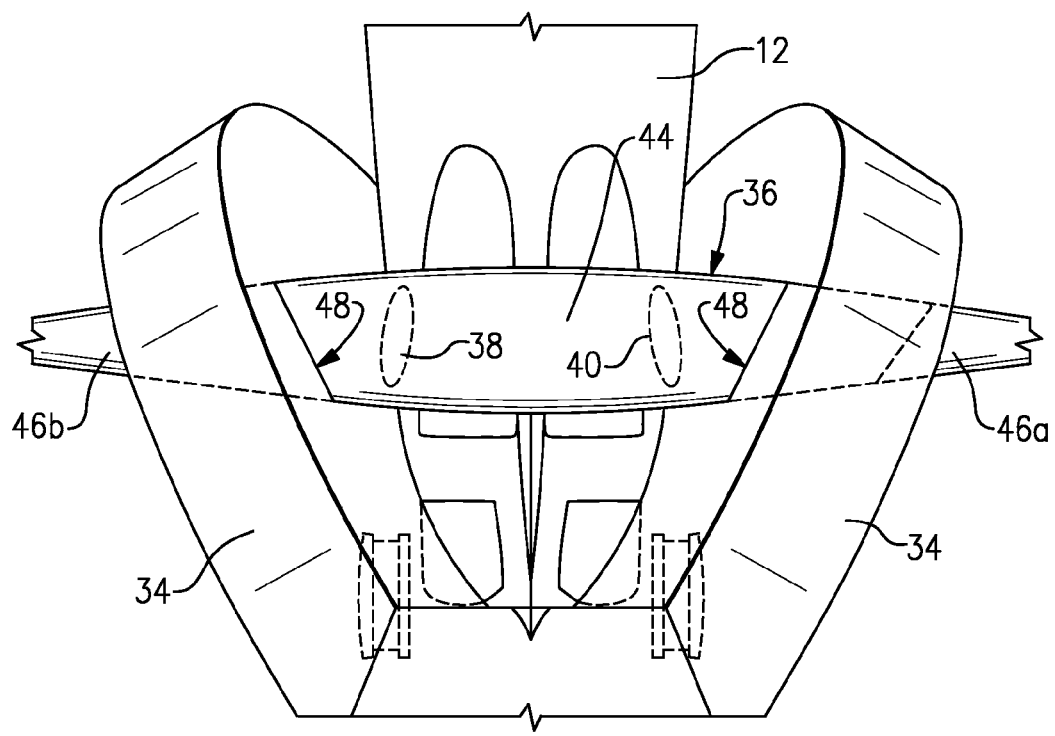
FIG. 4 is a top view of an example tail assembly.
Figure 5:
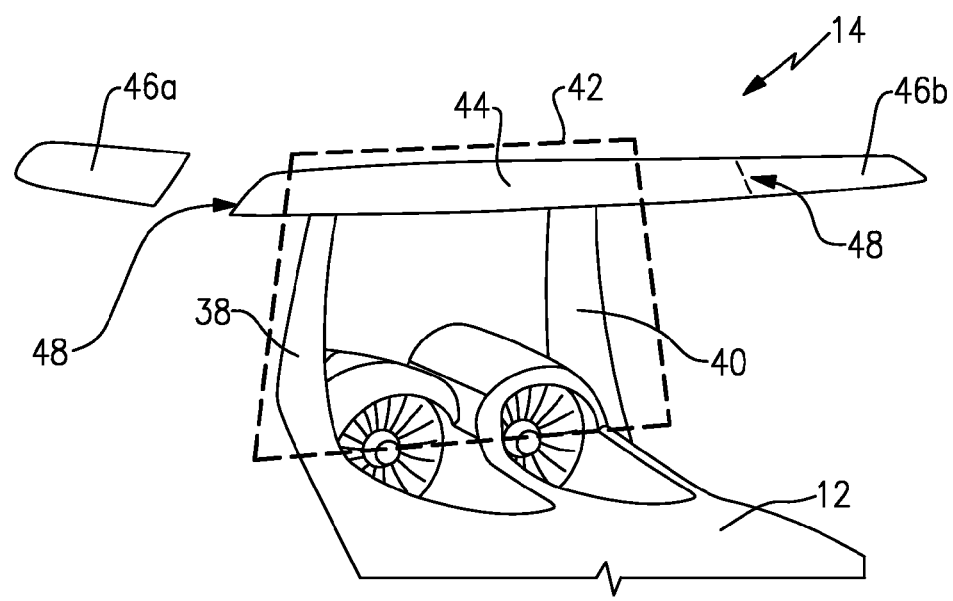
FIG. 5 is a schematic view of a separated portion of the example tail assembly.
Figure 6:
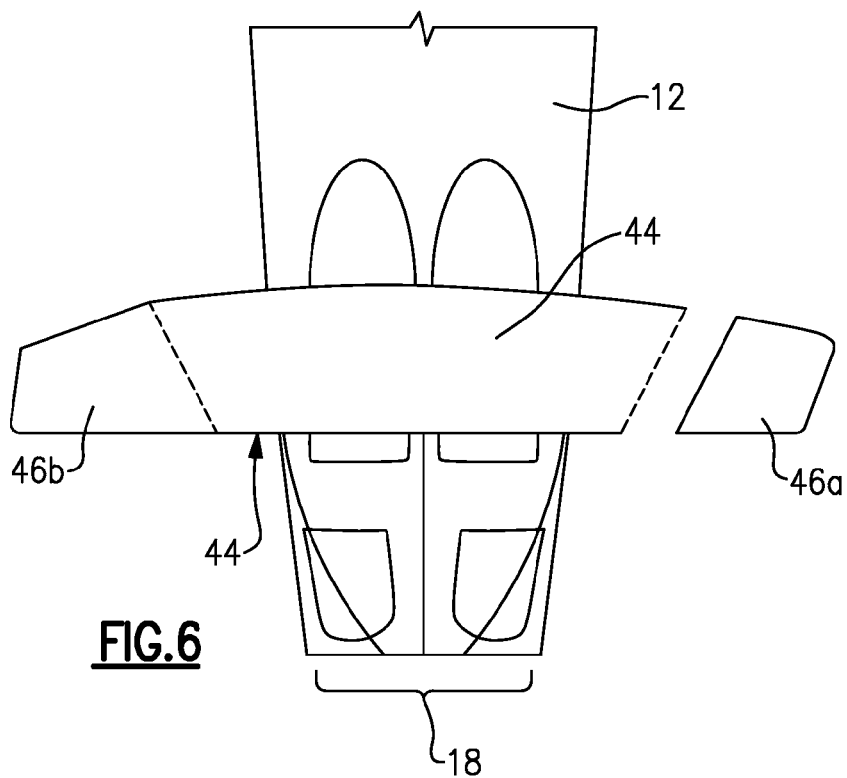
FIG. 6 is a top view of the example tail assembly with a separated sacrificial secondary control surface.

Referring to FIGS. 4, 5 and 6, the tail 14 is shown with the frangible connections 48 as part of the horizontal stabilizer 36. The frangible connections 48 are disposed on either side of the primary control surfaces 44. The primary control surface 44 is supported between the first and second vertical stabilizers 48, 40. The secondary control surfaces 46a-b that define the sacrificial surfaces are disposed on distal ends of the horizontal stabilizer 36 within the burst zones 34.

In operation, during a fragmentation event of one of the gas generators 20a-b, fragments may be present within the burst zone 34 and result in damage to one of the sacrificial secondary control surface 46a as is schematically shown in FIGS. 5 and 6. The sacrificial secondary control surface 46a may sustain damage without separating from the tail 14 and/or may separate in a controlled manner along the frangible connection 48. In either instance, the primary control surface 44 remains intact to provide aircraft stability and control.

Accordingly, the example aircraft architecture includes features that enable the use and operation of control surfaces within the burst zones by including controlled break away portions in addition to a structural box outside of the burst zone to maintain integrity of control surfaces outside of the burst zones.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft comprising;
a fuselage; and
a tail extending from the fuselage, the tail defining a structural box having first and second vertical stabilizers and a horizontal stabilizer supported atop the first and second vertical stabilizers, the tail including at least one sacrificial control surface and at least one primary control surface, the at least one sacrificial control surface including a defined frangible connection along which the sacrificial control surface breaks away from the tail responsive to a strike from debris, wherein the primary control surface maintains aircraft controllability upon the at least one sacrificial control surface breaking away from the tail.

2. The aircraft as recited in claim 1, wherein the at least one sacrificial control surface and primary control surface are part of the horizontal stabilizer.

3. The aircraft as recited in claim 2, wherein the horizontal stabilizer is spaced apart from the fuselage in a direction that is substantially perpendicular to a longitudinal centerline of the fuselage.

4. The aircraft recited in claim 2, wherein the at least one primary control surface is supported across the first and second vertical stabilizers.

5. The aircraft recited in claim 4, wherein the structural box includes the first and second vertical stabilizers and the at least one primary control surface that is supported across the first and second vertical stabilizers.

6. The aircraft as recited in claim 1, including a propulsion system mounted to an aft end of the fuselage and a burst zone defined about the propulsion system that encompasses the at least one sacrificial control surface.

7. The aircraft recited in claim 6, wherein the propulsion system comprises a gas turbine engine including a gas generator disposed about a first axis driving a fan section disposed about a second axis angled relative to the first axis.

8. The aircraft recited in claim 7, wherein the first axis is angled relative to a longitudinal centerline of the fuselage.

9. The aircraft recited in claim 7, wherein the gas generator includes a fan drive gear system for driving the fan section.

10. An aircraft assembly comprising
a fuselage including a forward portion and an aft portion;
a turbine engine mounted within the aft portion, wherein a burst zone is defined about the turbine engine; and
a tail disposed at least partially with the burst zone, the tail portion including a horizontal stabilizer supported across a first vertical stabilizer and a second vertical stabilizer, wherein the horizontal stabilizer further includes at least one sacrificial control surface including a defined frangible connection to the horizontal stabilizer along which the at least one sacrificial control surface breaks away from the horizontal stabilizer in a defined manner responsive to a strike to the sacrificial control surface by a foreign object within the defined burst zone.

11. The aircraft assembly as recited in claim 10, wherein a primary control surface extends across the first vertical stabilizer and the second vertical stabilizer.

12. The aircraft assembly as recited in claim 10, wherein the at least one sacrificial control surface is disposed at distal ends of the horizontal stabilizer.

13. The aircraft assembly as recited in claim 12, wherein the primary control surface is disposed between sacrificial control surfaces.

14. The aircraft assembly as recited in claim 10, wherein the turbine engine comprises first and second turbine engines defining corresponding first and second burst zones.

15. The aircraft assembly as recited in claim 14, wherein the first and second turbine engines include corresponding gas generator sections disposed about different axes that are angled away from each other.

16. The aircraft assembly as recited in claim 15, wherein the gas generators are angled relative to a longitudinal centerline of the fuselage.

* * * * *

UNITED STATES PATENT AND TRADEMARK OFFICE
CERTIFICATE OF CORRECTION

PATENT NO. : 9,884,674 B2  
APPLICATION NO. : 14/440995  
DATED : February 6, 2018  
INVENTOR(S) : Suciu et al.

Page 1 of 1

It is certified that error appears in the above-identified patent and that said Letters Patent is hereby corrected as shown below:

In the Claims

Claim 16, Column 6, Line 21; replace "the gas generators" with --the gas generator sections--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*